Dec. 14, 1943.  B. C. BRISTOW  2,336,462
APPARATUS FOR MANUFACTURING PISTON RINGS
Filed Dec. 11, 1940  2 Sheets-Sheet 1

INVENTOR:
BARNARD C. BRISTOW,
By Sylvester N. Hartz
ATTORNEY.

Dec. 14, 1943.                B. C. BRISTOW                 2,336,462
           APPARATUS FOR MANUFACTURING PISTON RINGS
                   Filed Dec. 11, 1940          2 Sheets-Sheet 2
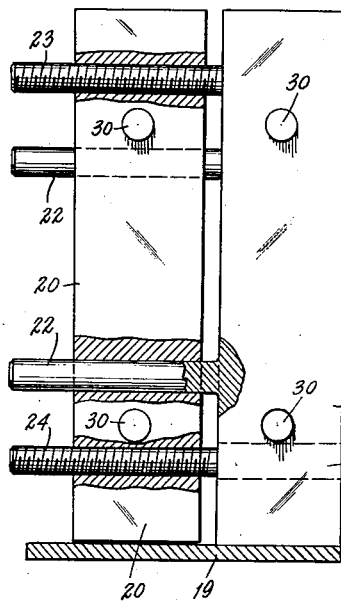
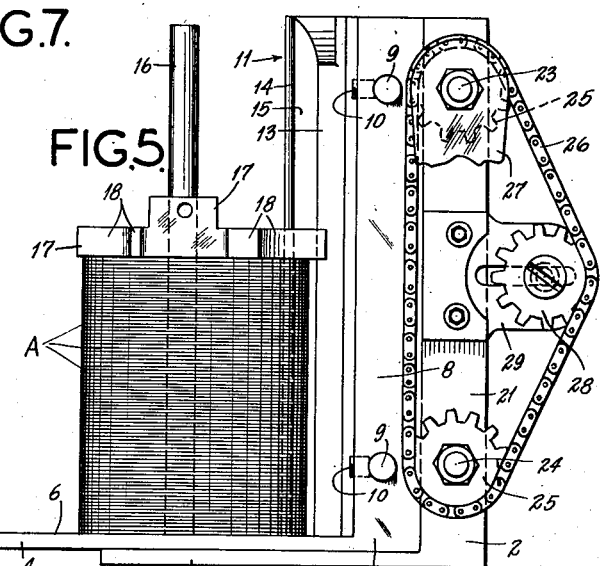
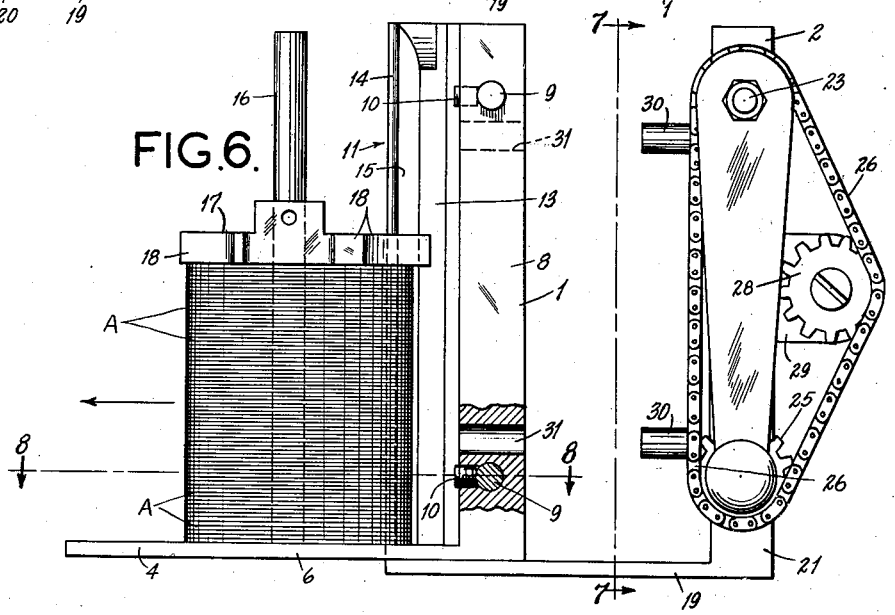
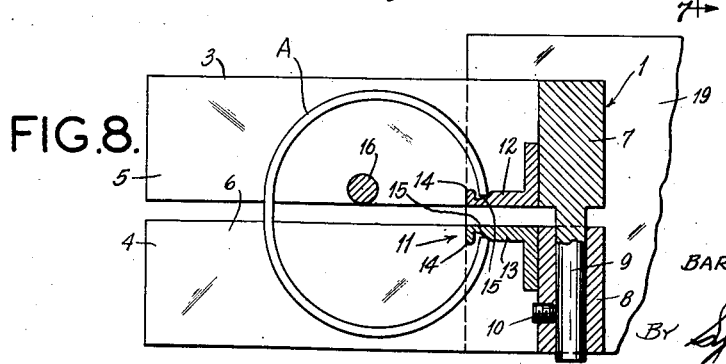
INVENTOR:
BARNARD C. BRISTOW,
By Sylvester N. Harty
                ATTORNEY.

Patented Dec. 14, 1943

2,336,462

UNITED STATES PATENT OFFICE 2,336,462

APPARATUS FOR MANUFACTURING PISTON RINGS

Barnard C. Bristow, Burlingame, Calif., assignor to McQuay-Norris Manufacturing Company, St. Louis, Mo., a corporation of Delaware Application December 11, 1940, Serial No. 369,621

5 Claims. (Cl. 29—1)

My invention relates to apparatus for manufacturing piston rings, and more particularly, to apparatus which may be used in the production of rings described and claimed in my co-pending application Serial No. 347,840, according to the method described therein.

In its broader aspects, my invention is directed to an apparatus for spreading split piston rings, comprising means to engage the rings and means to cause the ring-engaging means to move the ends of the rings away from each other.

In its narrower aspects, my invention relates to an apparatus comprising a holder and a spreader separable from each other. The holder includes a pair of base blocks movable relative to each other, and each of the base blocks has means to engage the end of a ring adjacent the split therein. The spreader comprises a pair of members movable relative to each other and adapted to be fastened removably to the base blocks. The members and the base blocks are arranged so that as the members are moved away from each other, the base blocks and the ring-engaging means move away from each other also, to spread the ends of the rings in the respective planes of the rings. A suitable mechanism is provided to move the members of the spreader toward or away from each other.

Having thus briefly described my invention, one object thereof is to provide apparatus for spreading split piston rings which operates efficiently and is simple in construction.

Another object of my invention is to provide apparatus for spreading split piston rings which may be heated to substantially high temperatures without injuring the apparatus.

A more particular object of my invention is to provide an apparatus for spreading split piston rings which may be used to perform the method described in my co-pending application mentioned above.

Other objects and advantages will be apparent to those skilled in the art from the following description which relates to the drawings showing a preferred embodiment of my invention, and wherein like numerals designate like parts throughout the several views.

In the drawings, Fig. 1 is a plan view of the apparatus.

Fig. 5 is a side elevation of the apparatus with the crank removed.

Fig. 6 is a side elevation of the apparatus with the parts separated.

Fig. 7 is a vertical view taken on line 7—7 of Fig. 6, partly in section.

Fig. 8 is a horizontal section on line 8—8 of Fig. 6.

Referring to the figures, the apparatus for spreading split piston rings shown therein comprises split piston rings shown therein comprises a holder 1 and a spreader 2 separable from each other so that after the ends of the rings A are spread a predetermined distance, the holder and spreader may be detached one from the other and the holder may be placed in a heat treating furnace so that the rings may be heat treated according to the teachings of the method for manufacturing piston rings described in the above mentioned co-pending application.

Figure 2:
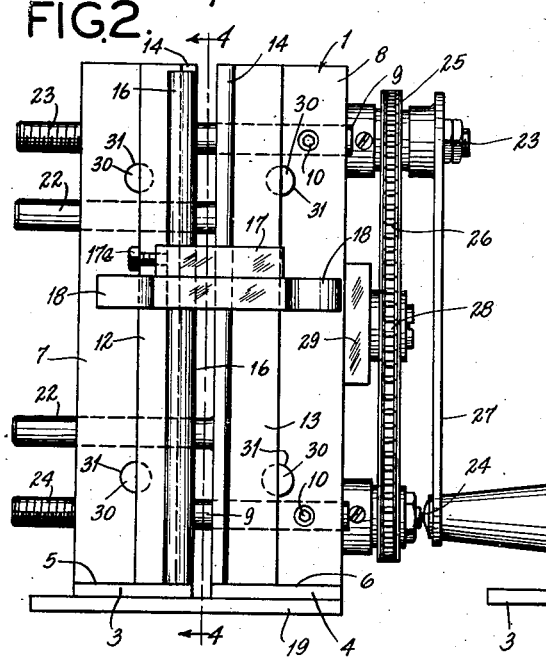
Fig. 2 is a front view thereof.
Figure 4:
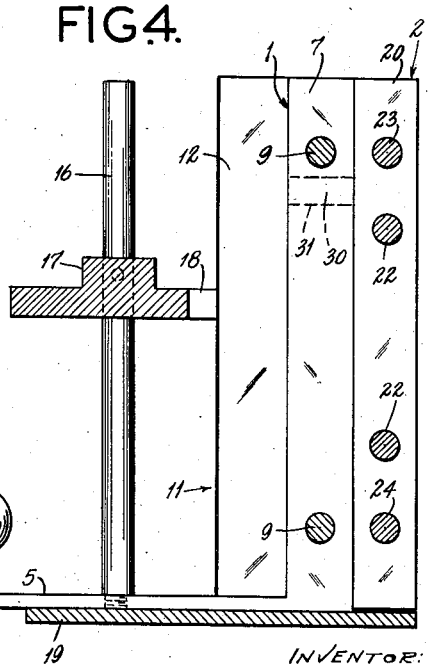
Fig. 4 is a sectional view taken on line 4—4 of Figs. 1 and 2.

The holder comprises a pair of base blocks 3 and 4, including horizontal portions 5 and 6 respectively, and vertical portions 7 and 8 respectively, as shown in Figs. 2 and 4.

The base blocks 3 and 4 are slidably supported on rods 9 to permit movement of the blocks relative to each other. A locking mechanism is provided for maintaining the base blocks 3 and 4 in adjusted position after the base blocks are spaced a predetermined distance from each other, and includes the set screws 10, arranged to engage the rods 9 after adjustment to prevent movement of the base blocks thereon.

The vertical portions 7 and 8 of the base blocks 3 and 4 are provided with ring-engaging means 11 which may be formed integrally with the base blocks, or may be separable therefrom and attached rigidly to the base blocks. In either event the ring-engaging means is shaped and arranged as shown clearly in Fig. 8 and includes a pair of parts 12 and 13 each attached to a base block and each having a flange 14 at the edges thereof remote from the base blocks and a tapered portion 15 between the base block and the flange 14.

The rings A to be spread are positioned in registry on the horizontal portions 5 and 6 of the holder 1, one on top of the other, with the gaps of the rings in alignment. The rings are arranged on the holder so that the ring-engaging means engages the rings at the ends thereof adjacent the gap.

To prevent the rings from buckling and to prevent the rings from falling from the holder, a vertical rod 16 is attached to the horizontal portion 5 of the base block 3 and slidably connected to the rod 16 is a retaining part 17 which may be adjusted to any desired vertical position on the rod 16, by the set screw 17a, the adjustment depending on the number of rings being spread during a single operation.

Figure 1:
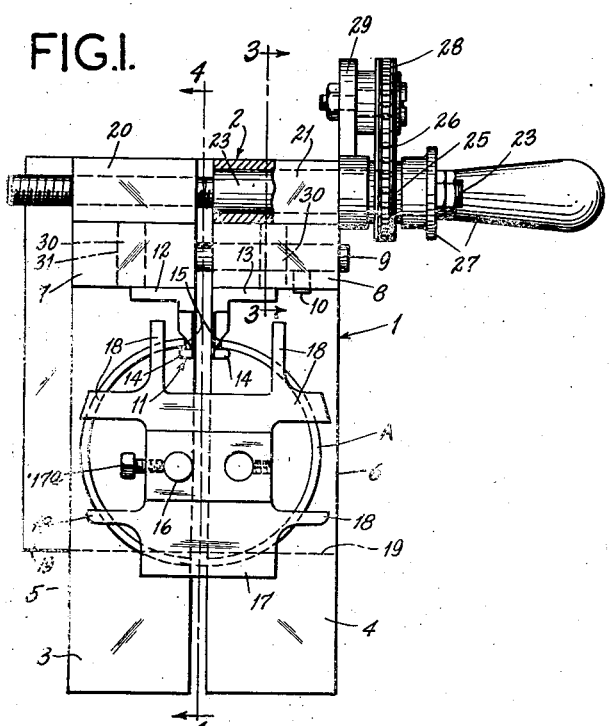
Figure 3:
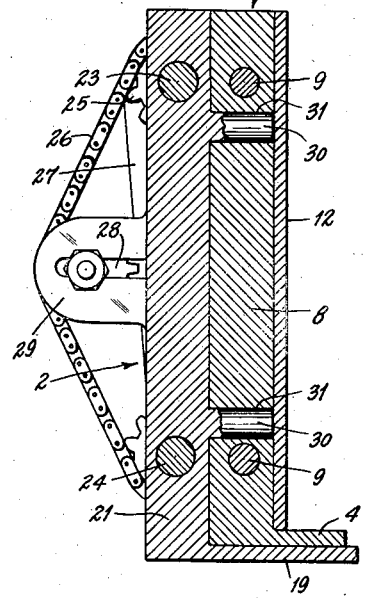
Fig. 3 is a sectional view taken on line 3—3 of Fig. 1.

The retaining part 17 is shaped and arranged as shown in Fig. 1 and includes a series of projections 18 adapted to engage the rings A at spaced points, and the projections are arranged to accommodate the ring engaging means 11 on the base blocks 3 and 4.

The spreader 2 is formed and arranged to move the base blocks 3 and 4 relative to each other to separate the ring engaging means 11 to spread the rings. As mentioned above, the spreader 2 is detachable from the holder 1, so that the holder alone may be placed in a heat treating furnace according to the teachings of the method described in the above mentioned co-pending application.

The spreader 2 comprises a horizontal base 19 and a pair of vertical members 20 and 21. The member 21 is attached rigidly to the base and the member 20 is movable relative thereto, and obviously the member 20 is movable also relative to the member 21. The movable member 20 is slidably mounted on the rods 22 attached rigidly to the fixed member 21. The movable member 20 also is threaded to a pair of threaded shafts 23 and 24 rotatably supported in the fixed member as shown clearly in Fig. 1, and each shaft has at an end thereof adjacent the fixed member a sprocket 25 driven by a chain 26. Adjacent the sprocket 25 on the threaded shaft 23 is a crank 27 by which the shafts 23 and 24 may be rotated to move the vertical members 20 and 21 relative to each other.

An idle sprocket 28 is rotatably supported on a bracket 29 attached to the fixed member 21. The idle sprocket 28 is adjustable relative to the bracket 29 so that the tension of the chain 26 may be adjusted.

The movable and fixed members 20 and 21 respectively each are provided with a pair of pins 30 adapted to fit into openings 31 in the vertical portions 7 and 8 of the base blocks 3 and 4. The pins 30 frictionally engage the base blocks 3 and 4 and the holder 1 therefore may be separated easily from the spreader 2.

The ring spreader described above is used to manufacture developed pattern rings according to the method described in my co-pending application mentioned above and is used more specifically to distort the embryonic rings to non-circular shape. The ring spreader is operated as follows: A quantity of rings A are placed on the horizontal portions 5 and 6 of the base blocks 3 and 4, and the rings are arranged to encircle the vertical rod 16. The rings A are clamped loosely between the retaining part 17 and base blocks 3 and 4 and they are arranged in registry with each other and with the gaps in alignment. The ends of the rings at the gaps engage the ring engaging means 11 of the base blocks 3 and 4. When the rings are placed on the base blocks 3 and 4, the base blocks are in closed position and are mounted on the spreader 2 with the pins 30 in engagement therewith. The crank 27 of the spreader 2 is then rotated until the gap in the rings assumes a predetermined length or until the rings assume a predetermined diameter. The holder 1 is then locked in this position by adjusting the set screws 10 so that the base blocks 3 and 4 cannot move relative to each other. The retaining part 17 then is adjusted to clamp the rings firmly between the base blocks 3 and 4 and retaining part 17.

The holder 1 then is separated from the spreader 2 and may be placed in a heat treating furnace for the purpose mentioned above. After the rings are heat treated a sufficient time and at the required temperature and after they have cooled, the holder 1 again is placed on the spreader 2 with the pins 30 located in the openings 31 and in engagement with the base blocks 3 and 4 of the holder. The crank 27 of the spreader 2 is rotated so that the spreader moves together the base blocks 3 and 4 of the holder and the rings then are removed therefrom.

The ring spreader described above is simple in construction and operates efficiently. The holder is separable from the spreader and the holder may be heat treated to substantially high temperatures without injuring the apparatus. By thus making the holder separable from the spreader it is unnecessary to heat and subsequently cool the entire device after heat treating a quantity of rings, because only the holder with the rings is placed in the heat treating furnace.

Also, holders adapted to accommodate various sized rings may be used on the same spreader, and thus it will be apparent that only one spreader may be used for a number of holders of various sizes.

It should be understood that other arrangements may be used also without deviating from the scope of my invention as defined in the appended claims. For instance, the rings may be spread by inserting a wedge between the ends of the rings and supporting the rings at the heels or at the edges of the rings adjacent the gaps and thus separating the ends of the rings.

What I claim as new and desire to secure by Letters Patent is:

1. An apparatus for spreading split piston rings, comprising a ring holder and a spreader, said ring holder including means to receive said rings and means to engage the rings at the ends thereof adjacent said split, said spreader being arranged relative to said holder to cause said engaging means to move the ends of said rings away from each other, and said holder and said spreader being separable from each other.

2. An apparatus for spreading split piston rings, comprising a holder for said rings and a spreader separable therefrom, said holder including a pair of base blocks movable relative to each other and each having means to engage an end of the ring adjacent the split therein, said spreader being adapted to engage said base blocks and move said base blocks relative to each other to move the ends of said rings away from each other, and a locking mechanism on said holder to maintain the ends of said rings in a predetermined spread position.

3. An apparatus for spreading split piston rings, comprising a holder and a spreader, said holder including a pair of base blocks movable relative to each other and each of said base blocks having means to engage the end of a ring adjacent the split therein, said spreader comprising a pair of members movable relative to each other and adapted to be fastened to said base blocks, said members and said base blocks being arranged so that as said members are moved away from each other, said base blocks and said ring engaging means move away from each other, also to spread the ends of said rings in the respective planes of said rings.

4. An apparatus for spreading split piston rings, comprising a holder and a spreader, said holder including a pair of base blocks movable relative to each other and each of said base blocks having means to engage the end of a ring adjacent the split therein, said spreader comprising a pair of members movable relative to each other and adapted to be fastened removably to the base blocks, said members and said base blocks being arranged so that as said members are moved away from each other, said base blocks and said ring engaging means move away from each other, also to spread the ends of said rings in the respective planes of said rings, and mechanism to move said members of said spreader toward and away from each other.

5. An apparatus for spreading split piston rings and maintaining said rings in spread position while said rings are subjected to a heat treating operation, said apparatus comprising a holder and a spreader, said holder including a pair of parallel base blocks movable relative to each other and each of said base blocks having means to engage an end of each of said rings adjacent the split therein, said spreader being adapted to move said base blocks relative to each other to move the ends of said rings away from each other, said base blocks being arranged so that as they move away from each other they are maintained in parallel position, whereby all of said rings are spread equally.

BARNARD C. BRISTOW.

CERTIFICATE OF CORRECTION.

Patent No. 2,336,462. December 14, 1943.

BARNARD C. BRISTOW.

It is hereby certified that error appears in the printed specification of the above numbered patent requiring correction as follows: Page 1, second column, line 11, after the syllable "prises" strike out "split piston rings shown therein comprises"; and that the said Letters Patent should be read with this correction therein that the same may conform to the record of the case in the Patent Office.

Signed and sealed this 15th day of February, A. D. 1944.

(Seal)
Henry Van Arsdale,
Acting Commissioner of Patents.